Jan. 3, 1961 T. T. HUCKABEE 2,967,023
MEANS FOR SMOKE-FLAVORING FOOD
Filed Nov. 19, 1957
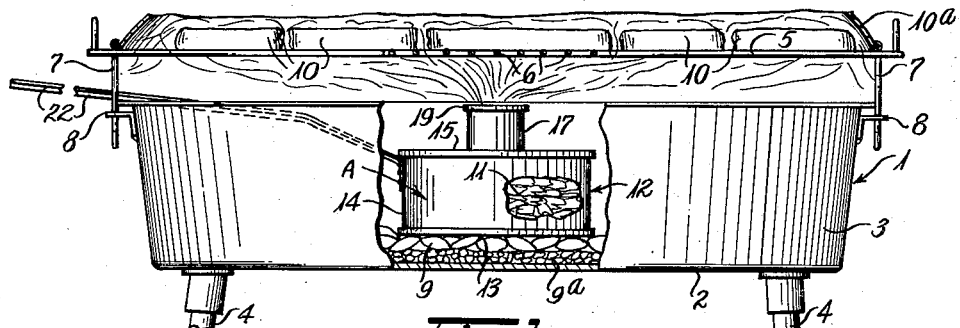
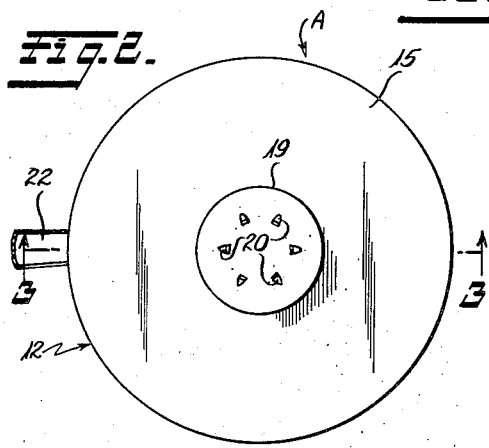
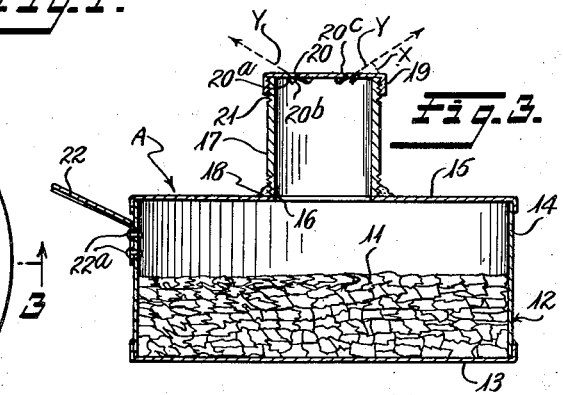
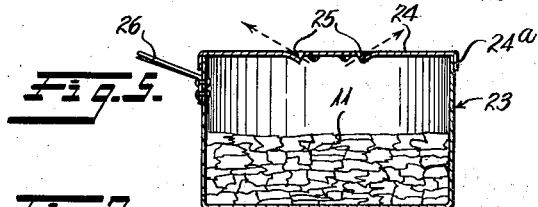
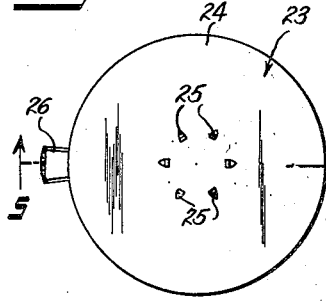
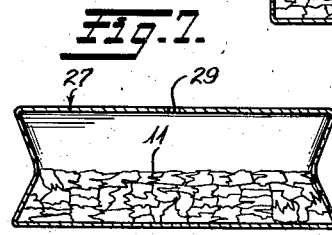
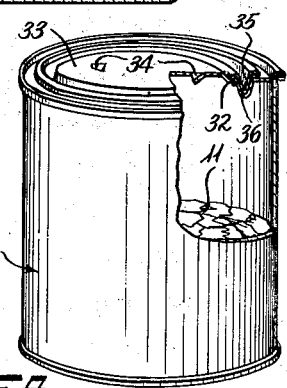
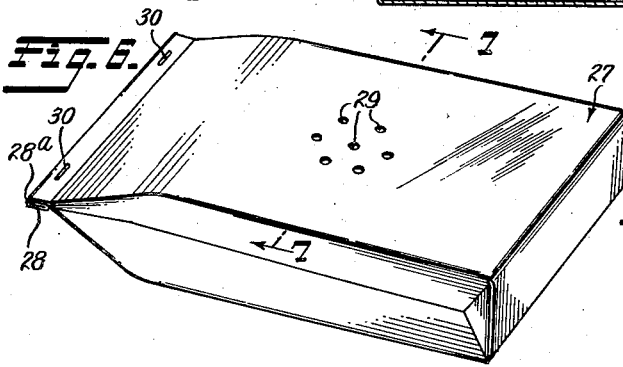
INVENTOR.
Thad T. Huckabee
BY
Bacon & Thomas
ATTORNEYS United States Patent Office 2,967,023
Patented Jan. 3, 1961

2,967,023
MEANS FOR SMOKE-FLAVORING FOOD
Thad T. Huckabee, P.O. Box 749, Albany, Ga.
Filed Nov. 19, 1957, Ser. No. 697,419
9 Claims. (Cl. 239—60)

This invention relates to a package comprising a container and food-smoke producing material in the container, adapted for use with barbecue grills and the like for smoke-flavoring food.

It is a common practice to smoke food, such as fresh meat, fowl and fish over a barbecue pit, grill, stove, etc. Smoke resulting from the combustion of fuel such as hickory chips is often relied upon to treat the food to give it a smoked flavor. The chips are usually placed by hand, or with an implement, directly on the fuel bed, after cooking has proceeded to the desired extent.

This method of smoking food is not satisfactory because the chips frequently burst into flame and quickly burn up instead of merely smoldering and producing the desired smoke. In addition, considerable undesirable debris and litter may be deposited on the food as a result of handling the loose chips, which is avoidable by the present invention.

It has been found that if the food-smoke producing material employed to treat the food is confined in a receptacle having apertures which properly restrict the inflow of air, flame combustion does not occur. A restricted amount of air may be permitted to enter the receptacle, as smoke and fumes escape, but the air should not be sufficient in amount to support combustion accompanied by flame-burning. As the smoke producing material is charred, fumes, vapors and smoke are liberated and escape through the apertures to treat the food. The terms fumes, vapors and smoke as applied to this invention refer to the products of destructive distillation of organic material, as distinguished from the fumes and smoke which result from combustion, accompanied by flame-burning, of organic material in an atmosphere containing an excess of oxygen.

One of the most common organic materials employed to smoke food is hickory wood chips. In describing the package of this invention, reference is made to hickory chips as the material confined therein. However, the invention is not to be considered as limited to this one material, since any suitable organic material might be employed, including materials specially treated to supplement the smoke flavor.

It is an object of this invention to provide a package containing food-smoke producing material with which to treat food that is clean and easily handled.

Another object is to provide a closed receptacle for hickory chips or the like which will not be consumed or destroyed when placed directly on the fuel bed or heating means in a barbecue pit, grill, stove, oven, etc.

Another object is to provide a container for hickory chips or the like which can be readily recharged with fresh chips.

Another object is to provide a container for hickory chips which permits smoke fumes to escape therefrom, but does not permit sufficient air to enter to support combustion accompanied by flame-burning.

Another object is to provide a container for hickory chips, having specially designed openings therein, which tend to prevent small particles of the hickory wood from falling out when the package is inverted in handling.

Another object is to provide a container for hickory chips having inclined openings therein which direct fumes and smoke upwardly and outwardly to uniformly and evenly envelope the food.

Another object is to provide a container for hickory chips which may be moved about over the fuel bed or heating means while treating food with smoke fumes issuing therefrom.

Another object of this invention is to provide a receptacle wherein, by restricting oxygen when heated, will char wood to provide a maximum amount of smoke flavor to food, meat, fish or fowl in a minimum time of exposure.

Another object of this invention is to provide a vessel that will impart a regulated amount of smoke without applying heat to foods being smoked, thereby eliminating the shrinkage which otherwise results from loss of moisture from the food being treated.

Another object of this invention is to provide a vessel of minimum size that will produce from a small amount of dry wood a great volume of smoke.

These and other objects of the invention will become apparent from the following description taken in connection with the accompanying drawings, in which:

Fig. 1 is a side view of a barbecue grill, partly in section, having a package-container embodying this invention associated therewith;

Fig. 2 is an enlarged plan view of the container shown in Fig. 1;

Fig. 3 is a sectional view through the container taken on line 3—3 of Fig. 2;

Fig. 4 is a plan view of a modified form of package;

Fig. 5 is a sectional view taken on line 5—5 of Fig. 4;

Fig. 6 is a perspective view of another form of package;

Fig. 7 is a sectional view taken on line 7—7 of Fig. 6; and

Fig. 8 is a perspective view, partly in section, of another form of package.

The barbecue grill illustrated in Fig. 1 is merely illustrative of one type of cooking device with which the present invention may be employed and includes a metallic fire pot 1 of any desired configuration, having a bottom 2 and a side wall 3. The fire pot 1 is supported on legs 4 secured to the bottom 2.

A wire grill 5 formed of metal rods 6 is adjustably supported over the receptacle 1 by legs 7 depending therefrom. Grill 5 and legs 7 are vertically adjustable on brackets 8, secured to the side wall 3 of the receptacle 1.

Charcoal briquettes, coal, wod or other fuel 9 is placed on a layer of gravel 9a in the bottom of the fire pot 1 and the food 10 to be cooked is placed on the grill 5.

The fuel 9 is ignited and the grill 5 is adjusted vertically so that the proper amount of heat reaches the food 10. A hood 10a is mounted upon the grill 5 to retain heat during cooking, and to later retain smoke to flavor the food 10, as will be described more fully hereinafter.

One form of this invention, intended for large barbecue grills or pits, comprises the package A shown in Figs. 1–3. Hickory chips 11 partially fill a metal can or receptacle 12, which is illustrated as being round but may be of any desired configuration. The receptacle 12 includes a bottom 13, a side wall 14, and a top wall 15. The top wall 15 is provided with an opening 16 at the center thereof. One end of a chimney 17 surrounds the opening 16, and is secured to the top wall 15, as by welding shown at 18. A closure member 19 provided with a plurality of apertures 20 is secured to the outer end of the chimney 17 by screw threads 21.

By properly forming apertures 20, the fumes and smoke which issue from the package A when it is heated may be directed laterally and upwardly from the package in order to cover a large area and thus treat the food quickly and uniformly. By forming the axes Y of the apertures 20 at an acute angle X of 30° to the plane of the horizontal wall of closure member 19, the fumes and smoke will travel laterally upwardly from the package A as they escape. As shown in Fig. 3, the axes Y of apertures 20 are radially disposed and include a rounded wall portion directed outwardly and upwardly with respect to the center of the closure member 19.

The apertures 20 are formed by piercing the closure member 19, forcing a small tab 20a to the inner side of the closure. As no metal is removed by the piercing operation, the forward edge 20b of the tab 20a lies beneath the edge, 20c, of the apertures 20. A package having apertures 20 formed therein in this manner may be inverted so that the apertures are directed downwardly without losing small chips or dust from the package, since such material cannot fall directly downwardly through said apertures.

A handle 22 is attached to the side wall 14 of the receptacle 12, as by rivets 22a and is sufficiently long so that it extends outwardly past the side wall 3 of the fire pot 1. Thus, by means of handle 22, the receptacle 12 containing the hickory chips 11, can be moved about over the fuel embers 19, and beneath the food 10, being smoked.

For large outdoor barbecue pits or grills, the receptacle 12 may be constructed of 10-gauge black sheet iron and may be about six to eight inches in diameter and about three inches deep. The opening 16, and the opening through chimney 17, may be about two and one-half inches in diameter while chimney 17 may be about one and seven-eighths inches long. Each aperture 20 in the closure member 19 may be equivalent in transverse cross-sectional area to a circular opening of about three-sixteenths to one-quarter inch in diameter so that smoke fumes from the hickory chips can escape from the receptacle through the chimney to smoke food, but the flow of air into the receptacle is restricted so that flame-burning of the chips does not occur.

Hickory chips, which are charred without flame-burning, produce ample smoke fumes that impart a delicate and desirable flavor to food. By providing apertures 20 of the proper size and number, the flow of air into the receptacle can be restricted so that the chips are slowly charred without flame-burning.

For smaller outdoor barbecue pits or grills the receptacle 12 may be made of lighter gauge sheet metal and the dimensions reduced in side. For example, the receptacle may be about four and one-half inches in diameter and two and one-half inches deep constructed of about 16 gauge sheet metal. The opening 16 in the top wall 15, and the opening through chimney 17, may be smaller, for example, about two inches in diameter. Also each aperture 20 in closure member 19 may be reduced in size so as to be equal in transverse cross-sectional area to a circular opening of about one-sixteenth to one-eighth inch in diameter.

The modified package illustrated in Figs. 4 and 5 includes hickory chips 11, partially filling a metallic container or receptacle 23. A closure member 24 provided with a depending sidewall 24a is mounted on and frictionally engages the side wall of the receptacle 23 and is provided with apertures 25. A handle 26 is secured to the receptacle so that said receptacle may be moved about on the heating means while smoking food.

This package may be employed in the same manner and for the same purpose as the one previously described. As it is designed for smaller barbecue pits, grills and the like, about 28 gauge sheet metal may be employed to form the receptacle 23 and closure member 24. Apertures 25 in the closure member 24 are formed in the same manner as those shown in Figs. 1 to 3 and each is equal in transverse cross-sectional area to a circular opening about one-sixteenth of an inch in diameter. The receptacle 23 may be about four inches in diameter and about two and one-half inches deep.

Closure member 24 may be removed in order to place fresh hickory chips in the receptacle 23 or remove residue therefrom. Closure member 19 of the receptacle 12, illustrated in Figs. 1 to 3 may be removed for a like purpose. By having the hickory chips confined in a portable receptacle, no debris and litter result from handling the hickory chips.

Figs. 6 and 7 illustrate an inexpensive form of package which may be thrown away after it has been used once. This package includes hickory chips 11 confined in a metallic, bag-like receptacle 27. The receptacle 27 may be constructed of heavy aluminum foil in the form of a container, bag or envelope and includes a flap 28 for closing an opening 28a. Apertures 29 are formed in the center of one wall of the receptacle 27. After the hickory chips are inserted into the receptacle 27, the opening 28a is closed by folding the flap 28 over the opening 28a and securing it by staples 30, or any other means.

The apertures 29 in the receptacle 27 should be of an appropriate size and number so that fumes may escape from said receptacle, but insufficient air enters to support combustion by flame-burning. Five to seven holes not over one eighth inch in diameter have been found to be satisfactory for this purpose.

A metal foil receptacle about 7 inches long, by about three and one-half inches wide, by about one to one and one-half inches thick, partially filled with about one and one-quarter ounces of hickory wood chips, has been found to be convenient and satisfactory for most smoking purposes.

Fig. 8 illustrates another modified form of package. Here a metallic receptacle 31 provided with an opening 32 is partially filled with hickory wood chips 11. A closure member 33 having apertures 34, formed as in Figs. 1 to 3, is mounted over the opening 32 to close the receptacle 31. As shown in cross section, the closure member 33 is provided with an annular U-shaped flange 35 which mates with an annular U-shaped recess 36 provided in the receptacle 31. By pressing flange 35 into recess 36, the closure member 33 is frictionally secured to the receptacle 31.

The receptacles or containers illustrated in Figs. 1 to 8 are formed of metal. Therefore, they may be placed directly on the fuel bed or heating means of a barbecue pit or the like without being consumed or destroyed.

In the use of the several forms of package disclosed herein, the food is cooked to the degree desired before the grill is lifted from the fire pot. Preferably, the fuel bed then consists of red hot embers, rather than fuel that is burning with appreciable flame. The smoke producing package is then placed directly on the fuel bed so that heating thereof soon causes the chips to char and produce smoke. The grill and hood are replaced on the fire pot over the package. The hood then collects smoke to produce the desired smoking action. The use of a hood is not critical, but its presence aids in rapidly smoking the food, which should not require more than about five to ten minutes time.

It will be understood that various changes may be made in the design, proportions, construction and arrangement of the several forms of package disclosed herein, without departing from the principles of the invention or the scope of the annexed claims.

I claim:

1. A package to be placed in a barbecue grill device or the like to smoke food, comprising: a metallic container including a wall having an opening; a chimney extending outwardly from said wall and communicating with the interior of said container through said opening; a mass of hickory wood chips partially filling said container; and a removable closure member mounted on said chimney having openings therein, each opening being equal in transverse cross-sectional area to a circular opening of about one-sixteenth of an inch to about one-quarter of an inch in diameter, and the axes of said openings forming an acute angle with the wall of said closure member in which said openings are formed.

2. A receptacle to be placed in a barbecue device or the like, and adapted to contain suitable material for producing smoke to flavor food, comprising: a metallic container having an access opening formed therein; and a removable metallic closure member mounted on said container over said opening, said closure member having a wall provided with apertures extending therethrough of sufficient size and number to allow smoke fumes to escape from said container, when heated, to flavor food, but of insufficient size and number to allow enough air to enter said container to support flame-burning of said smoke producing material, the axes of the apertures forming an acute angle with the wall of the closure member in which they are formed, whereby smoke issuing through said apertures will be diffused in predetermined directions.

3. A receptacle as defined in claim 2, in which the closure member is circular and the apertures formed therein are disposed radially and are defined in part by an upwardly and outwardly inclined wall portion.

4. A receptacle as defined in claim 2, in which each aperture is equal in transverse cross-sectional area to a circular opening of about one-sixteenth of an inch to about one-quarter of an inch in diameter.

5. A receptacle as defined in claim 2, in which the axes of the apertures form an acute angle of about 30° with the wall of the closure member in which said apertures are formed.

6. A receptacle to be placed in a barbecue grill device or the like and adapted to contain a food-smoke producing material to smoke-flavor food, comprising: a metallic container including a wall having an opening; a chimney extending outwardly from said wall and communicating with the interior of said container through said opening; and a removable closure member mounted on said chimney having apertures therein of sufficient size and number to allow smoke fumes to escape from said receptacle, when heated, to flavor food, but of insufficient size and number to allow enough air to enter said receptacle to support flame-burning of said chips.

7. A receptacle as defined in claim 6, in which each opening is equal in transverse cross-sectional area to a circular opening of about one-sixteenth of an inch to about one-quarter of an inch in diameter.

8. A receptacle as defined in claim 6, in which the axes of the openings form an acute angle with the wall of the closure member in which said openings are formed.

9. Smoke producing means adapted to be used with a device having a smoke chamber for smoke-flavoring food, comprising: metallic container means including a top wall, said top wall having an aperture extending therethrough; a chimney mounted above said top wall and communicating with the interior of said container means through said aperture, said container means being adapted to receive a mass of smoke producing material therein; and a removable member mounted on said chimney having restricted aperture means for discharging and directing smoke fumes issuing from said container means, when externally heated, to a smoke chamber to smoke-flavor food therein.

References Cited in the file of this patent

UNITED STATES PATENTS

| | | |
|---|---|---|
| 207,268 | Goodin | Aug. 20, 1878 |
| 1,969,506 | Frey | Aug. 7, 1934 |
| 2,449,695 | Galloway | Sept. 21, 1948 |
| 2,722,882 | Wilson | Nov. 8, 1955 |
| 2,789,877 | Pfundt | Apr. 23, 1957 |

FOREIGN PATENTS

| | | |
|---|---|---|
| 517,130 | Belgium | Feb. 14, 1953 |